(12) United States Patent
Conti

(10) Patent No.: US 12,481,077 B2
(45) Date of Patent: Nov. 25, 2025

(54) APPARATUS AND METHOD FOR ACQUIRING TOMOGRAPHIC IMAGES USING MICROWAVES

(71) Applicant: ISTITUTO NAZIONALE DI FISICA NUCLEARE, Rome (IT)

(72) Inventor: Nadim Conti, Rome (IT)

(73) Assignee: Istituto Nazionale Di Fisica Nucleare, Rome (IT)

( * ) Notice: Subject to any disclaimer, the term of this patent is extended or adjusted under 35 U.S.C. 154(b) by 336 days.

(21) Appl. No.: 18/268,942

(22) PCT Filed: Dec. 21, 2021

(86) PCT No.: PCT/IB2021/062085
§ 371 (c)(1),
(2) Date: Jun. 21, 2023

(87) PCT Pub. No.: WO2022/137108
PCT Pub. Date: Jun. 30, 2022

(65) Prior Publication Data
US 2024/0053496 A1    Feb. 15, 2024

(30) Foreign Application Priority Data

Dec. 21, 2020    (IT) .................... 102020000031724

(51) Int. Cl.
*G01T 1/29*        (2006.01)
(52) U.S. Cl.
CPC .......... *G01T 1/2985* (2013.01); *G01T 1/2992* (2013.01)

(58) Field of Classification Search
CPC .. G01T 1/2992; G01T 1/2985; A61B 18/1815
See application file for complete search history.

(56) References Cited

U.S. PATENT DOCUMENTS

| | | | |
|---|---|---|---|
| 2013/0166004 A1 | 6/2013 | Fallik | |
| 2014/0155740 A1* | 6/2014 | Semenov | A61B 5/704 600/425 |
| 2014/0218230 A1* | 8/2014 | Ostadrahimi | G01N 22/00 342/179 |
| 2016/0120439 A1 | 5/2016 | Castelli et al. | |
| 2017/0188874 A1* | 7/2017 | Suhami | A61B 5/0042 |
| 2017/0199134 A1* | 7/2017 | LoVetri | A61B 5/0536 |
| 2017/0292919 A1 | 10/2017 | Mccollough et al. | |
| 2020/0138329 A1 | 5/2020 | Reilly et al. | |

OTHER PUBLICATIONS

International Search Report for International Patent Application No. PCT/IB2021/062085, dated Apr. 20, 2022.
International Written Opinion for International Patent Application No. PCT/IB2021/062085, dated Apr. 20, 2022.

* cited by examiner

*Primary Examiner* — Gerald Johnson
(74) *Attorney, Agent, or Firm* — Workman Nydegger

(57) ABSTRACT

The invention consists of an apparatus and method for first level detection of tumour masses, pleural effusions and cysts, using time-of-flight reflectometry and dielectric spectroscopy, with the advantage of speeding up the diagnosis of these pathologies compared to the use of Computerized Tomography (CT) and/or Nuclear Magnetic Resonance (NMR).

12 Claims, 10 Drawing Sheets

APPARATUS AND METHOD FOR ACQUIRING TOMOGRAPHIC IMAGES USING MICROWAVES

BACKGROUND ART

Every day in Italy more than 1000 new cases of tumours are diagnosed, i.e. masses of tissue that grow in excess and abnormally, compared to normal tissues, with a total incidence that, depending on the Italian regions considered, is between 0.7 and 0.5% [1].

A scenario with an incidence up to three times higher and much lower mortality comes from the presence of cysts, in particular intracranial arachnoid cysts (CAI). In fact, cysts, which are sacs closed by a distinct membrane containing a liquid or semi-solid material, reach an incidence of 1.6% in the arachnoid area, calculated in two retrospective cohort studies on a total of 60,155 patients undergoing neuroimaging, [2] [3], potentially involving up to 960,000 Italians [4].

These pathological conditions, although generally asymptomatic [2], can lead to the limitation of cognitive and executive functions [5], higher values of anxiety and depression [6] and other more complex pathological pictures [2] [3] [7].

The biological behaviours of CAI and their diverse clinical manifestations are often not consistent with the imaging results [7] [2]. For these reasons, the diagnosis of CAI is not easy and occurs most of the time in a fortuitous way [2]. In order to try to limit complications from CAI, including potentially counter-productive prescriptions following incorrect diagnoses, which according to a general study which is not focused only on CAI would reach up to 4.9% of the total considered [8], first level evaluation techniques should be guaranteed to the treating physicians which techniques are able to communicate the possible presence of CAI or other pathologies in the patient under treatment. However, the reduced availability of CT and NMR machines, which averages at 26.79 and 16.73 per million inhabitants in Europe [9], and the use, in case of CT, of ionizing waves that are harmful to patients [10] [11] [12], poses problems of use and operating cost [13] [14] [15] for first-level analyses, especially for their use in physicians' offices or small hospitals.

Currently, in fact, the main techniques used to investigate and reveal the presence of CAI or tumours include the use of CT or NMR machines [2], but in both cases of use there are problems of operational cost and structure.

The complications in the use of current machinery are mainly due to the amortization of the machinery and the structure where to place it, the resources necessary for their correct functioning and the cost of personnel, as well as the shielding of the remaining instrumentation and the medical staff themselves [14] [15].

The very nature of these types of examinations poses limitations on the geographic locations where they can be carried out. This problem is mainly due to the use of ionizing radiation and strong magnetic fields (CT and NMR), resulting in the need for suitable environments that can shield them, using copper, phosphor bronze and composite carbon fibres [16] [17]. Those materials, added to the machinery, contribute to increasing the operating and amortization costs.

One further factor that discourages the use of CT machines for first level analysis, further reducing the availability of machinery for these operations, lies in the use of ionizing radiation, which is a risk factor for the patient [10] [11] [12].

The need to carry out first level assessments leads to having to exclude all those imaging techniques related with high risk factors for the patient (CT) [10] [11] [12] and all those whose availability is not high enough (NMR) to justify its use for this type of operation, potentially less urgent. Further to this, all those techniques with prohibitive operating costs for small medical practices and hospitals should also be excluded, placing both current solutions, CT and NMR, out of reach.

The present invention proposes an apparatus for the acquisition of first level diagnostic images that solves the problems related to the technologies described above.

SUMMARY OF THE INVENTION

The invention consists of an apparatus for carrying out tomographies by means of microwaves, in order to detect any tumour masses and/or cysts in a subject early on.

The invention also consists of a protocol for using this apparatus and a system which links the data acquired by a multiplicity of apparatuses as described below.

DETAILED DESCRIPTION OF THE INVENTION

Figure 1:
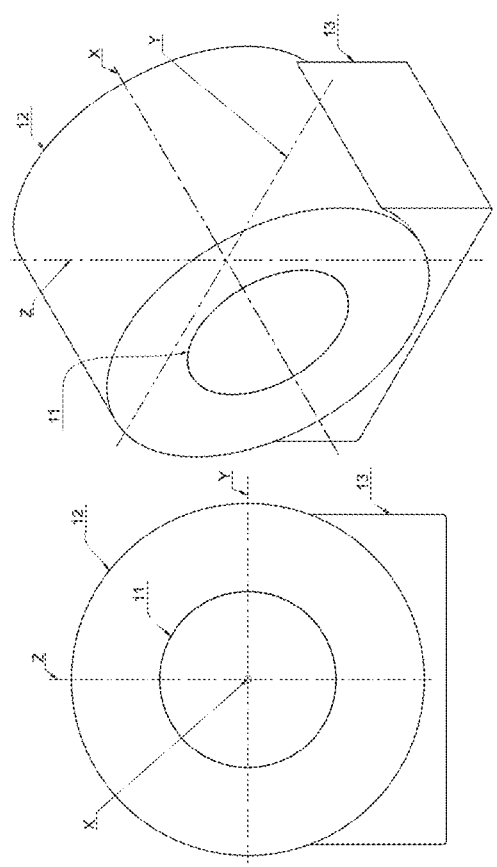
FIG. 1 shows a first preferred embodiment of the apparatus according to the invention (toroid).

The present invention uses electromagnetic waves (EM) with frequencies between 0.3 and 110 GHz. In this region of the electromagnetic spectrum the radiation is not ionizing

[18] and does not require particular external equipment or specially dedicated environments for shielding therefrom. The parts of the electromagnetic spectrum preferred by the present invention are between 0.8 and 8 GHz for the frequency band, which is dedicated to resolving details in depth, called for brevity "Inner Band", and between 70 and 90 Ghz for the frequency band which is dedicated to resolving superficial details, called for brevity "External Band".

The approach that one wants to follow using EM waves, albeit with some fundamental differences, recalls the operation of a computerized tomography (CT) device. For a CT scan, the patient is irradiated with X-rays which are then revealed on the other side of the body showing the negative of the crossed tissues [19]. Being the x-rays highly energetic, they are not substantially diffracted as they pass through the patient, they are only attenuated.

In the case of EM waves between 0.8 and 8 GHz, once the patient has been irradiated, diffraction and reflection phenomena will also have to be considered. This results in the need to use multiple angles between source and receiver, along which the electrical parameters of the transmitted, diffracted and reflected wave, called scattering parameters, are calculated, focusing in particular on the variations in the frequency spectrum of these transmitted and received waves. The procedure is very similar to impedance and dielectric spectroscopy analyses, however based on at least one database [20] [21] with features of the tissues of the subject being analysed. Further considerations can be drawn up by considering reflections in the time domain, caused by discontinuities in the properties of the medium through which the EM waves propagate [22]. These discontinuities are in our case given by the different composition of the tissues of which the human body is composed [20] [21], including tumour masses and/or cysts, the letter presenting a clear separation with respect to the rest of the tissues. In addition to causing reflections in the wave that crosses the discontinuity in the dielectric, different tissues will offer a different absorption and reflection spectrum with respect to one another [20] [21] [22], thus providing further information on what is being observed, both in the scattering parameters and in their spatial position given by the flight times of the different reflections.

Apparatus

For the purposes of the present invention, tomography means a technique aimed at the representation in layers or sections, not necessarily planar or parallel to each other, of body tissues or solid samples, for the identification of the composition of the same, at the material and topology level, with respect to layers or sections under analysis.

For the purposes of the present invention by subject the patient or anatomical part of the same is meant, whose tomographic images are to be acquired in order to diagnose the presence of tumours and/or cysts, by way of example. For the purposes of the present invention, by user the treating physician, specialist, technician, researcher or staff responsible for the use and control of the apparatus to acquire images of the subject is meant.

In the following, the radio transmitting and radio receiving elements are also called, for the sake of brevity, antennas.

The proposed apparatus consists of a main body which houses, by means of support means, a multiplicity of antennas, shields from external noise the support of the subject and the high-frequency cables connected to the antennas.

Furthermore, it will be evident to the person skilled in the art that said main body can form an environment covered inside by radio absorbing material (RAM) suitable for reducing reflections due to the structure of the apparatus itself, during the process of acquiring tomographic images of the subject. The main body also provides the environment suitable for the optimal performance of the components therein contained. By way of example, it will be evident to the person skilled in the art that where said components are sensitive to variations in humidity or temperature, the main body also comprises a conditioning unit of these environmental features.

The apparatus also includes a mechanism for moving the antennas installed inside or outside the main body.

The apparatus can be connected to a high-frequency cable system for powering and controlling the movement mechanism of the antennas themselves. For the correct functioning of the apparatus, this also includes a radio frequency signal generation and reception unit (Transceiver) which, starting from the connections to the high frequency cables connected to the antennas mentioned above, is responsible for generating the signals to be transmitted towards the subject and to receive the signals reflected, transmitted and refracted towards the antennas from and through the subject. Furthermore, it will be evident to the skilled in the art that said transceiver may in turn include more connections for receiving and transmitting signals (channels) towards the aforementioned high-frequency cables or a number of connections lower than the number of antennas with the addition of a selection circuit (multiplexer) placed between the transceiver and the high frequency cables.

The preferred structure proposed, in its use of multiplexers instead of numerous transceiver channels, is aimed and optimized to allow easy scalability and expansion of the imaging unit. The choice also contributes to reducing the impact on total costs due to the complex electronics present in the transceiver module.

The apparatus also includes a signal processing unit that performs the task of analysing the signals received by the transceiver and generating the same signals toward the same. In addition to this, the signal processing unit implements filtering techniques for the received signals, to reduce the noise injected therein from the environment. It will be clear to the persons skilled in the art that said signal processing unit may be part of the signal generation and receiving unit. The same processing unit can also implement the reconstruction algorithm thereby not requiring that it is applied by a computing unit.

The apparatus therefore makes use of a computing unit and a connection between that and the transceiver or signal processing unit. The computing unit can be external to the apparatus or integrated thereinto. Starting from the transceiver or the signal processing unit, the computing unit performs the task of applying the image reconstruction algorithm, controlling the position of the antennas through the movement system of the same, checking the status of the apparatus and monitoring of the subject and the environment.

In addition, the apparatus can be equipped with an interaction interface with the user of the apparatus, to allow its control and use. The interface can be implemented as software residing on the computing unit of the apparatus or on an electronic device external to the apparatus itself.

In a preferred embodiment of the invention, the apparatus comprises a further external network interface, connected to the computing unit, for processing the signals or on which the interaction interface resides, with the purpose of communicating with a network of apparatuses and/or centralized system, hereinafter referred to as, for brevity, network 901.

Main Body

More in detail, the invention consists of an apparatus for performing tomographies by means of microwaves, having a main body (12) (21) (31) which develops around an X axis comprising:

one plurality of radio transmitting and radio receiving elements (72);

at least one support (41) for housing said plurality of elements (72) such as to allow a first positioning at a distance R from a given point of the X axis and a second positioning wherein at least one of the elements is at a distance R' from said point, with R' different from R.

For a better understanding, in the text and in the attached figures reference is made to a system of axes, wherein the X axis is placed horizontally and parallel to the floor. However, the apparatus that develops around an axis other than the one described falls within the scope of the present invention. In fact, it is not excluded that the subject may position himself in an upright position with the apparatus that scans the subject from bottom up.

In a first embodiment of the invention, the main body (12) (21) consists of a hollow cylindrical structure whose axial symmetry axis is coincident with the X axis, adapted to perform linear movements along the X axis and/or circular movements with respect to the same axis, where the elements (72) are oriented towards the axis of the main body (12). Said embodiment is represented in FIG. 1.

Figure 2:
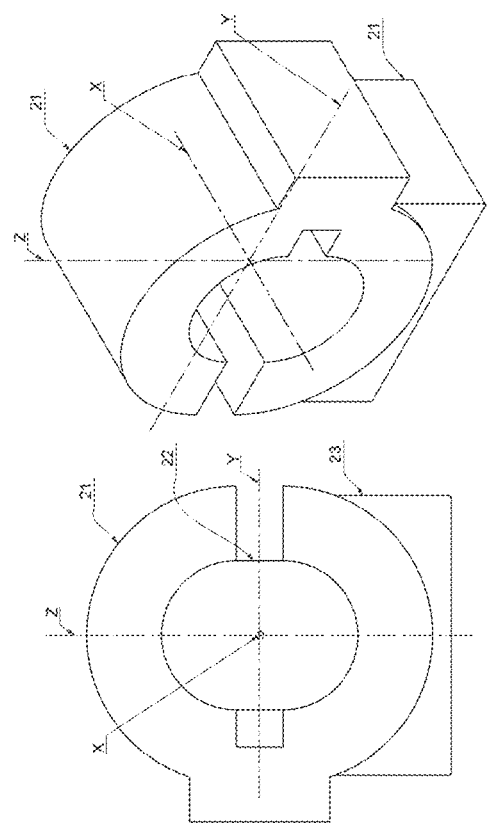
FIG. 2 shows a second preferred embodiment of the apparatus according to the invention (open toroid).

If a second embodiment of the apparatus is required which allows the positioning of the subject from a direction other than that of the X axis, it is possible to provide for a second variant wherein the embodiment described above further comprises a partial opening of the cylindrical structure (21) as best shown in FIG. 2.

All the aforementioned embodiments share values of R and R' between 5 and 50 centimetres.

It is essential that the acquisition of data relating to reflection and absorption of electromagnetic radiation (EM) transmitted and detected by the antennas (72) occurs at least from two different positions with respect to the subject. Since during the acquisition of the tomographic images the subject is placed at the X axis, this is equivalent to saying that R and R' are the distances of each antenna with respect to any point of the X axis in a first and a second configuration of the apparatus. The value of distance R is not necessarily the same for each antenna being part of the apparatus. Instead, it is important that there is at least one antenna associated to an R value between 5 and 50 centimetres. In a completely analogous way, it is not necessary that all the antennas (72) of the apparatus are at the same distance from the reference point, but it is sufficient that at least one value of R', R' being different from R and in any case between 5 and 50 centimetres, is associated to at least one of them.

The movement of the antennas (72) can be relegated to supports (41). In one preferred embodiment of the invention, the support (41) comprises two blades (42), on which one or more elements (72) are respectively housed, and such as to make a rotation movement on plane YZ around one fixing means (43), placed near one of the two ends of each blade (42). Said embodiment is shown in FIG. 4. By the term blade one elongated element having two main ends is intended; at one of the two ends it is equipped with a fixing means, for example one pin (43) (44), around which it can perform rotational movements on the YZ plane, which in fact result in approaching or moving away movements of the antennas anchored thereto, with respect to a reference point, on the X axis.

In one alternative embodiment, the support (41) comprises a single blade (42), on which at least two elements (72) are housed, such as to make one rotation movement on plane YZ around one fixing means (43), placed near one of the two ends of the blade (42). Unlike the embodiment comprising at least two blades (42), here it is sufficient to carry out the rotation movement on a single support element YZ plane, to obtain the double positioning of a multiplicity of antennas (42).

Figure 5:
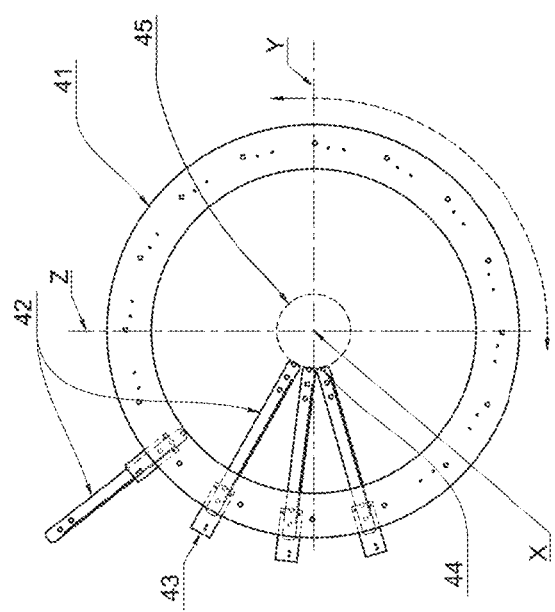
FIG. 5 shows the detail of the movement of the antennas in a radial direction with respect to the X axis, by linear guides, and circular direction around the X axis on plane YZ, by circular guides.
Figure 6A:
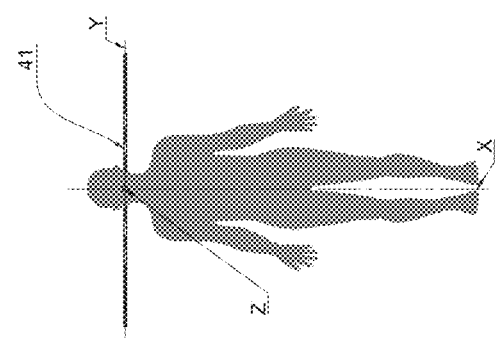
FIG. 6a shows a possible positioning of the patient within the implementations of FIGS. 1 and 2, where the support 41 lies on the YZ plane.
Figure 6B:
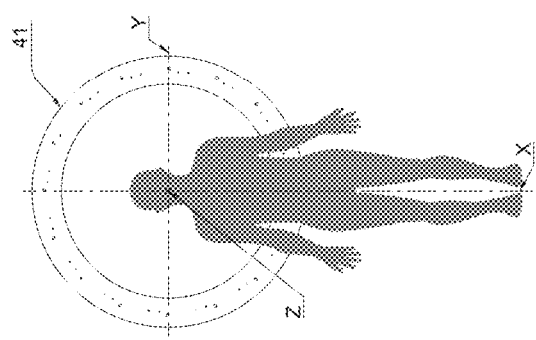
FIG. 6b shows a possible positioning of the patient within the implementations of FIG. 3, where the support 41 lies on the XY plane, parallel to the plane on which the patient lies.

Alternatively or in addition to the movement system of the antennas based on blades, the support (41) can house a multiplicity of antennas capable of performing linear movements along the radial direction with respect to the X axis, purely by way of example, by linear guides (42). Said embodiment is shown in FIG. 5.

Figure 3:
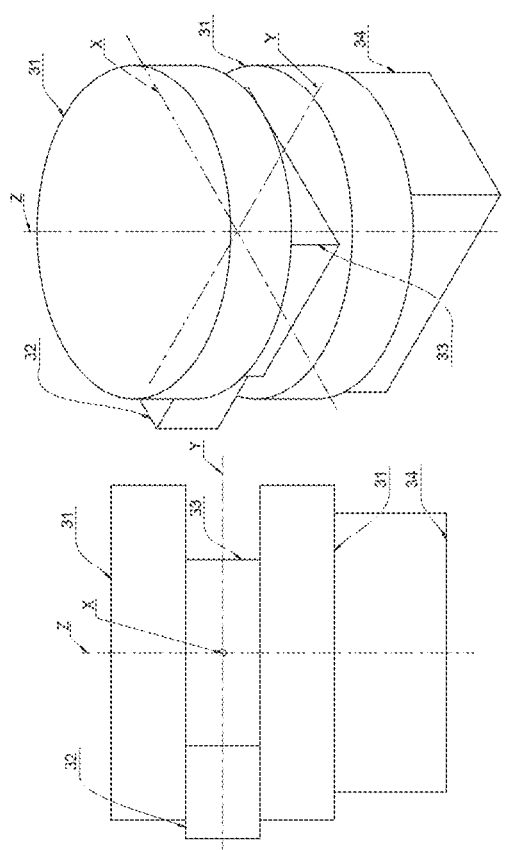
FIG. 3 shows a third preferred embodiment of the apparatus according to the invention (double plate).
Figure 4A:
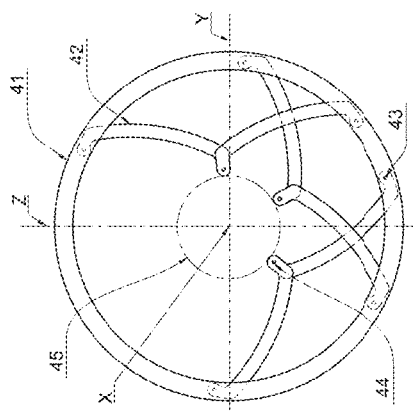
FIG. 4 (4a, 4b, 4c) shows an example of a support comprising three blades which house the antennas at three different positions of said antennas. The axes shown in FIG. 4 refer to the embodiments of FIGS. 1 and 2. For the embodiment of FIG. 3 the X and Z axes of FIG. 4 are exchanged.
FIG. 4d, instead, shows an irregular positioning of 16 antennas.
Figure 4B:
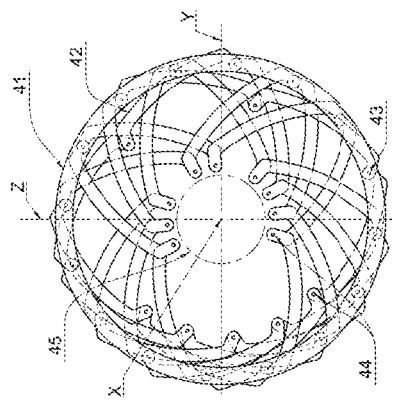
Figure 4C:
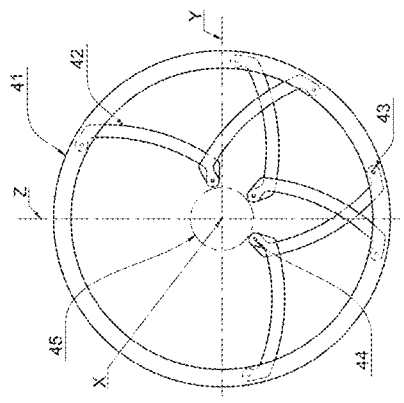
Figure 4D:
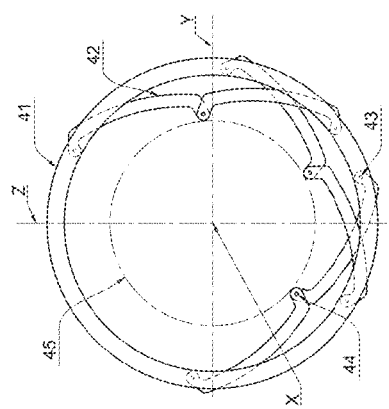

In a third embodiment of the invention, the main body (31) comprises two plates interposed with each other and with respect to the X axis, each of said plates comprising at least one support (41) whose radio transmitting and radio receiving elements are oriented parallel with each other, along one second axis Z, perpendicular to the X axis. Said embodiment is shown in FIG. 3.

Similarly to the first and second embodiments of the invention, the values of distances R and R' are between 5 and 50 centimetres. That range of values implies that the distance between the two interposed plates is between 10 centimetres and about 1 meter, making the apparatus adaptable to specific applications. For example, for the acquisition of tomographic images of a small anatomical part such as the knee, it is preferable to have an apparatus, the distance of which between the plates is between 12 and 30 centimetres. As for the diameter of said plates, it varies between 30 and 200 cm depending on the final application. The preferred dimensions of the present invention, in its third variant of FIG. 3 are comprised between 60 and 90 cm as a trade-off between the coverage of the anatomical part concerned and the small dimensions, to facilitate clinical use.

More specifically, the main body (12) (21) (31) consists of a structure supporting all the internal components, made of materials compatible with the apparatus. In fact, for all components exposed directly or indirectly to the electromagnetic waves generated by the apparatus towards the imaging area (11) (22) (33) where the subject is placed, such as for example the support (71) of the antennas (72) in FIG. 7, it is preferable to use non-metallic materials with relative dielectric permeability close to 1 and dissipation factor close to 0, to avoid strong reflections of electromagnetic waves. Preferred materials may, by way of example, include plastics, among which there is polytetrafluoroethylene (PTFE), synthetic polyamides such as Nylon and Kevlar, and specially synthesized fluoropolymers.

Furthermore, the main body includes one shielding made of conductive materials with a thickness of between 0.02 and 10 mm in proximity of its external walls, which can also act as a structural support. The shielding isolates the internal environment of the main body and relative imaging area (11) (22) (33) from the external environment. As will be evident to those skilled in the art, this insulation contributes to the reduction of external electromagnetic disturbances, thereby improving the performance of the apparatus, but it is not necessary for its operation and can be omitted where the degree of electromagnetic interference, from the external environment to the apparatus and vice versa, can be overlooked. If present, the shielding can be made of metallic or plastic materials loaded with magnetic or conductive powders.

Antennas Movement

Figure 7B:
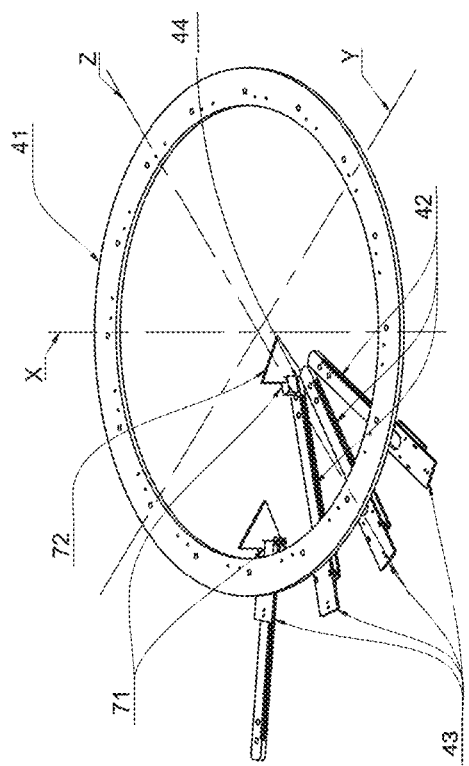
FIG. 7a,b shows preferred implementations of antennas connection on linear guides.
Figure 7A:
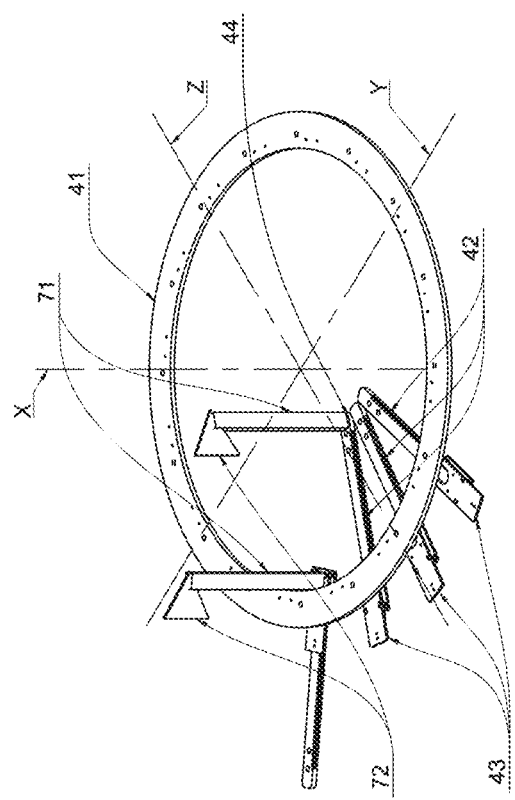
Figure 8:
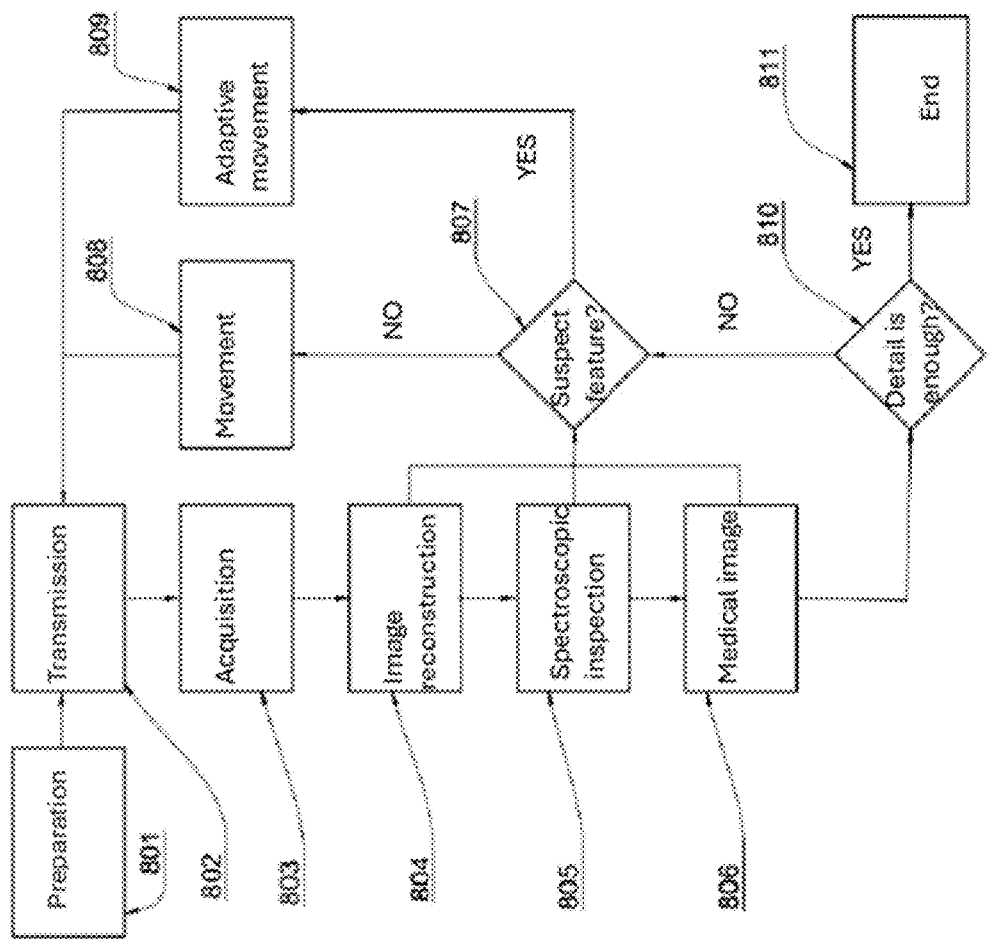
FIG. 8 shows the protocol for acquiring tomographic images without the support of a network, which is external to the apparatus in use.
Figure 9:
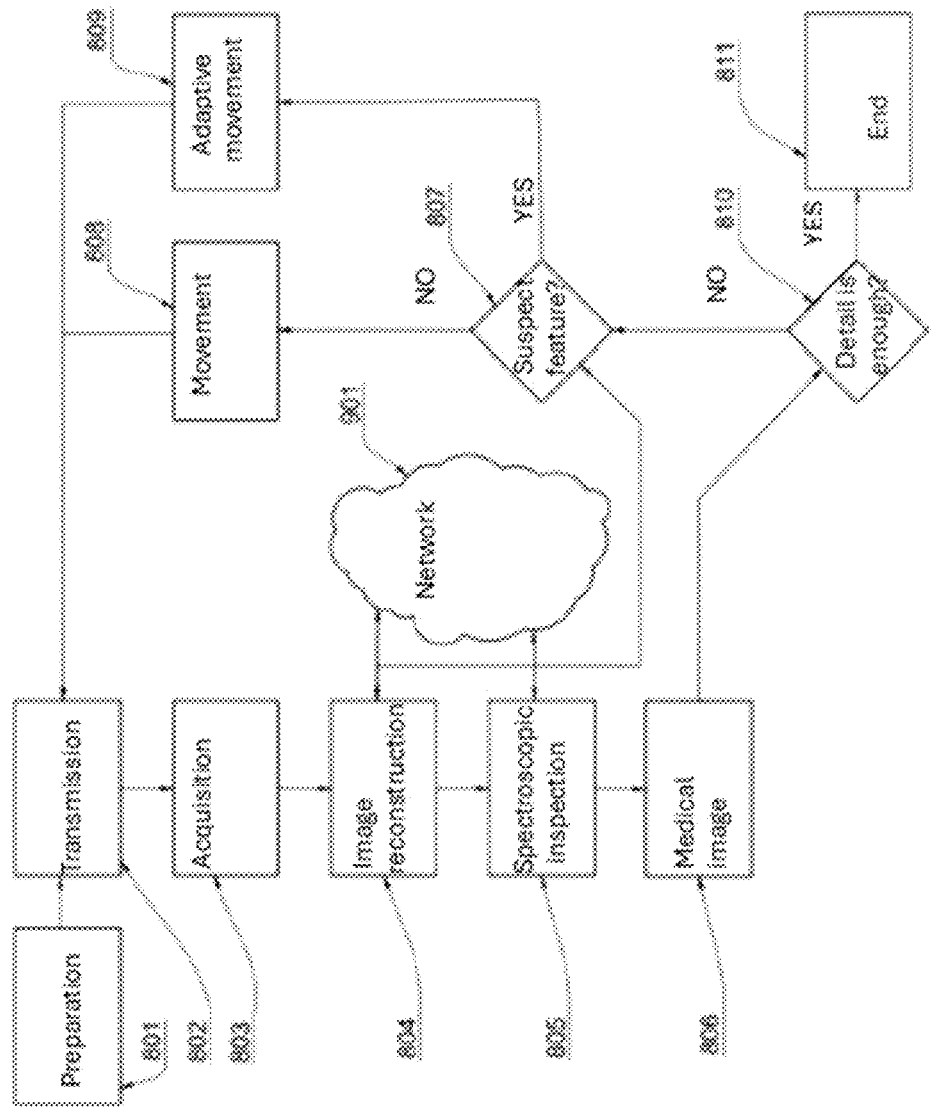
FIG. 9 shows the detail of the protocol for the acquisition of tomographic images with the add-on to support the analysis of a 901 network.
Figure 10:
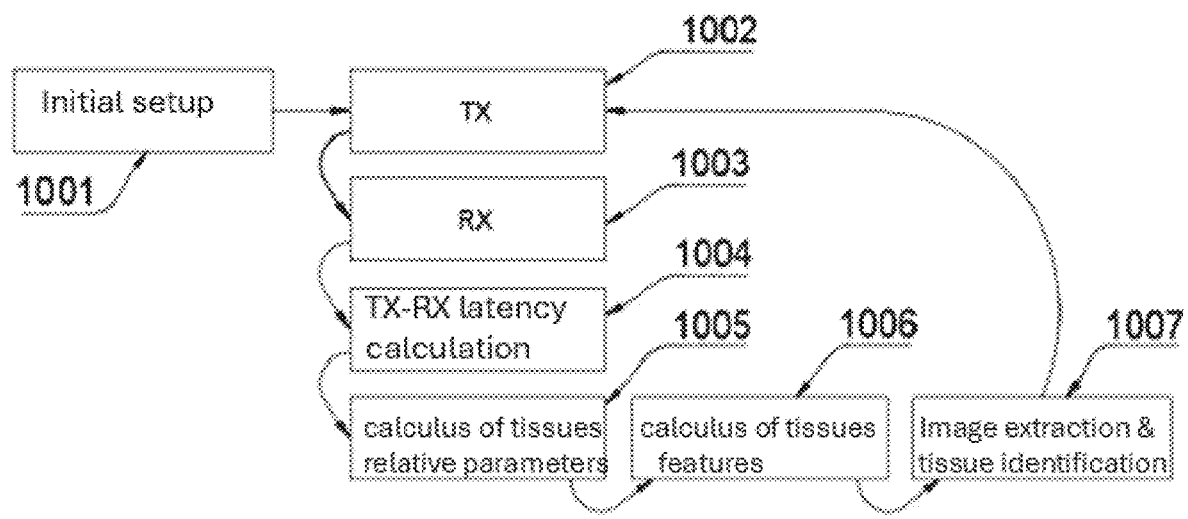
FIG. 10 shows the flow chart of the algorithm for the reconstruction of spectrum tomographic images.

The main body is equipped with a mechanical structure for moving the antennas, shown in FIG. 4, FIG. 5 and FIG. 7. The aforesaid structure allows the antennas to assume different positions as described below, in addition to supporting them together with the high frequency cables connected thereto. The parts of the structure located outside the main body are made of any material that has the required necessary mechanical features required for the correct operation of the apparatus and ensure the safety margins required by the existing standards. The parts of the structure placed inside the main body follow the indications mentioned above regarding the material features of the components exposed directly or indirectly to the electromagnetic waves generated by the apparatus towards the imaging area (11) (22) (33), where the subject is positioned.

The aforementioned movement structure is also composed of the motors whose purpose is to move the structure supporting the antennas (41) and the various parts connected thereto (42) (43). The positioning of the motors preferably occurs outside the main body, to reduce noise and reflections internal thereto. The motors have sufficient torque to ensure correct movement, thereby limiting the temperatures reached by them, and providing the operating margins required by current regulations.

The movement mechanical structure is also composed of the organs for transmitting the movement from the motors to itself and of motor control units required to preferably ensure an accurate movement and maintenance of the position at at least ¹/₁₀ of the vacuum wavelength associated to the maximum frequency emitted by the antennas in the internal band. The motor control units also ensure a smooth movement of the structure that does not cause harmful vibrations to the apparatus or that slow down its operations and verify the correct movement of the motors, after and during each control operation.

Antennas

The antennas, whose purpose is to emit and receive electromagnetic waves from and to the patient, are preferably obtained on Printed Circuit Board (PCB) or Flexible Printed Circuit Board (FPCB) technology, to minimize the costs attributable thereto. More specifically, it is preferable that the aforementioned antennas are characterized by a directivity, understood as the ratio between electromagnetic energy transmitted in the direction of the subject with respect to the energy transmitted in the opposite direction, as high as possible in order to minimize interactions of the antenna with the main body, and to minimize reflections given by the latter. The antennas must also preferably have an aperture at −3 dB, defined as the width in degrees of the main electromagnetic energy emission lobe of the antenna itself when it reaches 50% from its peak, which is as narrow as possible in addition to minimizing the number of secondary lobes and their amplitudes, to focus the emitted energy only in the desired direction, thus increasing the performance of the apparatus having to consider a smaller wave interaction area.

High Frequency Cables

The high-frequency cables that connect the antennas to the transceiver unit, being located within the main body, preferably have a reduced cross section to minimize reflections in the main body. In addition to this, the aforementioned high frequency cables preferably have a diameter of the internal conductor large enough to allow the signal generated and received by the transceiver not to be too attenuated during its path. Furthermore, the high frequency cables are made of flexible materials that can guarantee nominal performance even after a high number of bending due to the continuous movement of the antennas.

Connection System

More in detail, the apparatus in addition to having a main body (12) (21) (31) comprises a connection system (34) (23) (13) which can include the transceiver unit, signal processing unit, the connection between the two just mentioned, the computing unit and the external network interface as well as the interaction interface. That system includes, among other components, the connection between the high frequency cables connected to the antennas and the transceiver.

The transceiver can be achieved through a Vector Network Analyser (VNA), a combination of Spectrum Analyser and Function Generator or, as in the preferred implementation of the apparatus described here, by a Software Defined Radio (SDR). The transceiver unit generates and receives all signals from and to the antennas and has a passband for the generation and reception of signals at least as wide as the internal band.

The transceiver has a number of channels compatible with that of the antennas or a lower number, by exploiting additional external electronics (multiplexer). The additional external electronics has the purpose of guiding the signals to and from certain antennas, towards the individual channels of the transceiver module. Even though it will be clear to those skilled in the art that the option that includes more channels in the transceiver is the most performing one, the preferred implementation of this apparatus sees the presence of high-frequency multiplexers, between the high-frequency cables and the transceiver module, to reduce the costs of the apparatus itself.

The aforementioned high frequency multiplexers have a pass band at least equal to the internal band and preferably introduce the least number of distortions and attenuations to the signal circulating therein. Preferred parameters of the multiplexers for the present apparatus are an attenuation from the input port to the output port of less than 3 dB, a return-loss greater than 15 dB and an isolation between channel and channel greater than 20 dB. Furthermore, the multiplexers have a number of output and input channels equal to at least the sum of the antennas and channels present in the transceiver module, in order to be able to direct each antenna on the desired transceiver module channel.

The apparatus also includes the signal processing unit which, connected to the transceiver module, is responsible for filtering the noise collected by the antennas, by eliminating it from the signal to be analysed, calculating the flight times of the signals from antenna to antenna, extracting the parameters of scattering and transmission, eliminating from the signals all those features and defects due to the reflections, attenuations and distortions of the signal due to the single cables, multiplexers and to the main body itself. The signal processing unit can also take care of the application of the image extraction algorithm, where it is convenient and possible. Possible implementations of the signal processing unit are discrete component PCB boards, Computer, or the transceiver module itself in its implementation with VNA or Spectrum Analyser having an operating system installed therein, or, as in the preferred implementation of the apparatus here proposed, can be implemented using reprogrammable electronics in the form of a Field Programmable Gate Array (FPGA), or a Complex Programmable Logic Device (CPLD). It will be clear to those skilled in the art how the choice of using FPGA to process incoming signals and signals towards the antennas allows for a great calculation parallelism, minimizing the costs of the required electronics.

The apparatus further includes a calculation unit whose purpose is the control of the movement of the antennas, the control of the status of the apparatus, the control of the status of the environment wherein the apparatus operates, the control of the condition of the subject, the communication of the apparatus with the network of apparatuses, communication of the apparatus with the user interface, and of all the operations necessary for the correct functioning of the apparatus. The computing unit preferably has numerous connections for communication with dedicated electronics, such as, for example, connections for I2C, SPI, USB, 10 Gbit Ethernet, Pcie, Wifi and Bluetooth protocols and non-specialized adaptable connections. The computing unit deals with the movement of the antennas by sending commands to the motor control units which will then perform the movement providing telemetry signals, at the end and during the execution of the same. The apparatus may also include a power supply system and any batteries for its operation, once disconnected from the mains. The power supply system of the apparatus is responsible for converting the mains voltage into the voltages that can be used by the same as well as monitoring the mains voltage for dangerous conditions such as overvoltages, overcurrents, undervoltages or black outs. If one of these aforementioned danger conditions occurs, the power system disconnects the apparatus from the mains and switches it, where present, to battery-only operation as long as the dangerous condition persists.

It will be clear to those skilled in the art that the preferred solutions of the apparatus described here concur to obtain low consumption, thus allowing thereto to function even in conditions of mobility. For example, in field medical centres or in mobile units such as ambulances.

The apparatus may also include a unit for conditioning and monitoring the environment inside the main body with the aim of maintaining the relative humidity and the internal temperature between values that allow the apparatus and the components therein contained to function properly. In particular, the relative humidity inside the primary body should preferably be kept between 30 and 60%, while the internal temperature between 16 and 26 degrees. Furthermore, the air conditioning unit of the environment preferably filters the air entering the apparatus with anti-particulate filters to reduce the quantity of dust introduced therein, which could contribute to a reduction in the time between maintenance interventions, and damage the equipment or not allow to function optimally.

Optionally, a second conditioning unit of the external environment is used, in order to provide information to the conditioning unit of the internal environment, on how to best adapt it to improve the comfort of the subject and to avoid condensation phenomena.

The apparatus may also comprise an external network interface, connected to the computing unit, for processing signals or on which the user interaction interface resides, with the purpose of communicating with the network (901). The interface is preferably obtained using physical media and/or protocols capable of guaranteeing a high upload bit rate toward the network and low response latency therefrom. Preferably, the interface is made in standard Ethernet or optical fibre, the latter, as will be evident to the person skilled in the art, also intrinsically providing isolation from electromagnetic disturbances which would otherwise be brought from and to the apparatus along electrically conductive cables connected thereto. A further preferred implementation is obtained using wireless communication standards to ensure the operation of the apparatus even while moving or at locations where a wired network is not available. By way of example, wireless communication can take place via standard 802.11ax, 802.11ac, 802.11b/g/n/a to a local network or with LTE, WiMAX, 5G standards toward a wide area network.

Finally, the apparatus may comprise the apparatus user interface, with the aim of allowing the user to control the medical diagnostic functions of the apparatus as well as to control the state of the apparatus itself, the network and the environment wherein the apparatus is located. If rigidly connected to the apparatus, the interface is preferably made with digital colour screens connected to the computing unit and showing on said screens the controls necessary to operate the apparatus graphically. A second preferred implementation is achieved using a communicating wireless interface, by way of example with one of the protocols previously mentioned for the external interface, with computers already in the user's possession. In the latter preferred implementation, the user apparatus interface is implemented in the form of graphic software that can be installed on commonly used devices, such as smartphones, tablets or personal computers.

Protocol

The acquisition of the subject's tomographic images is carried out by performing the following main steps:

Arranging the apparatus and placing a subject (801) at the X axis within the imaging area (11) (22) (33)

Carrying out a first acquisition (802) (803) of the microwaves absorbed and reflected by the subject by means of the radio transmitting and radio receiving elements (72) placed at a distance R from a given point and/or in a relative position P with respect to the axes Z and Y of the axis, and reconstructing the obtained image (804) (805);

Carrying out a second acquisition (802) (803) of the microwaves absorbed and reflected by the subject by means of the radio transmitting and radio receiving elements (72) at a distance R' from said point and/or in a relative position P' with respect to the axes Z and Y, different from relative position P, and reconstructing the obtained image (804) (805).

It should be noted that the value of the distance R is specific for each antenna and it is not required that all the antennas, in a first positioning, be associated with the same value of R; the same applies to the value of R' in the second positioning and to the P and P' values.

It is evident for the person skilled in the art that a greater number of acquisitions allows increasing the number of views by the apparatus on the subject, virtually recreating a number of radio transmitting and radio receiving elements (72) greater than the number physically present in the apparatus. The greater number of views allows improving the spatial resolution of the image of the subject and increasing the sharpness of the edges between a tissue T and a different tissue T' adjacent thereto, as well as improving the spectral contrast of the apparatus. For the purposes of this apparatus, by spectral contrast it is meant the ability of the same to distinguish two tissues characterized by different dielectric physical properties. By way of example, the ability to distinguish between the presence of grey, white matter and cerebrospinal fluid.

It should be noted that it is evident for the person skilled in the art that the number of acquisitions and the accuracy of the apparatus, understood as spatial resolution, sharpness and spectral contrast, has a proportionality relationship with the number of acquisitions. The greater the number of acquisitions, the greater the acquisition time and the better the accuracy of the apparatus. The aforementioned accuracy of the apparatus is therefore a function of the acquisition time which, where necessary due to clinical doubts or doubts resulting from preliminary images, can be protracted over time or shortened if no clear doubts exists about the condition of the subject (810) (807). The acquisition times of the apparatus in the here detailed preferred configuration vary from a minimum of a few seconds for the first low-accuracy images up to require several minutes for the more detailed ones, depending on the requests that the user or the network make to confirm or deny a certain diagnostic hypothesis.

The movement (808) of the antennas can be carried out by means of any of the systems described in the discussion of the apparatus or with similar systems without thereby going beyond the scope of the patent.

A variant of the method also includes the step of conducting a spectroscopic investigation of the dielectric (805).

One variant of the method also includes the step of conducting a comparison of the image obtained from the single apparatus with all those contained by a network of devices (901), for recognizing patterns or recurring structures that can speed up and improve the diagnosis in terms of accuracy. In this variant, where the apparatus or the network recognize patterns to be explored and investigated (807), the antennas are arranged in such a way as to better resolve the area of interest to speed up the diagnosis (809). One example is given by FIG. 4d. Furthermore, in this variant, the user is asked to enter through the interface available thereto the symptoms, signs and the clinical picture of the subject, in addition to the diagnosis hypotheses that the user has of the subject's condition, to facilitate the analysis operations by the network.

The results of the analysis are presented to the user on the previously described interface (806) and are updated in real time, allowing the user to identify a zone to be solved with greater accuracy than the others or to conclude the analysis, once the required degree of detail and uncertainty on the image itself required (810) (811) has been reached.

Algorithm

Each tissue the subject is composed of has distinctive dielectric features and properties [20] [21] that define a Z wave impedance seen by the microwaves emitted by the antennas (72). By assuming that the tissue is isotropic, homogeneous, with negligible magnetic features and not volumetrically limited, we can indicate the Z wave impedance as:

$$Z = \sqrt{\frac{\mu}{\varepsilon}} = \sqrt{\frac{\mu_0}{\varepsilon_0 \varepsilon_r}} = \frac{Z_0}{\sqrt{\varepsilon_r}} \approx \frac{377}{\sqrt{\varepsilon_r}} \Omega \qquad \text{Formula 1}$$

However, being Z dependent on epsilon r (Permittivity), and being the latter variable as the frequency varies [20] [21], each tissue will show a different wave impedance as the frequency varies. Accordingly, in the presence of the separation between different tissues with different wave impedance, reflections [22] will be generated proportional to the difference in the impedances of the two media crossed at each given frequency. An index of the intensity of these reflections can be calculated through Formula 2 and called Rho12, where Z2 is the wave impedance of the medium into which the wave is penetrating and Z1 is the wave impedance of the medium from which the wave comes.

$$\Gamma_{12} = \frac{Z_2 - Z_1}{Z_2 + Z_1} \qquad \text{Formula 2}$$

Starting from the features of an initial medium T0, which for the apparatus described here is the air inside the main body, and knowing the dielectric features of the tissues present in the body of the subject, by analysing the spectrum of reflections it is possible to extract information that not only regards the internal structure of the subject (tomography) but also the material composition of the aforementioned structure (spectrography), thus helping the user and the same network of apparatuses in the diagnostic phase.

Once the system has been switched on and calibrated (1001) and the patient has been placed with the affected area within the imaging area (801), and possibly having entered on the user interface the symptoms, signs and clinical picture of the subject in addition to the hypotheses of diagnosis that the user has, of the condition of the subject, the instrument proceeds with the following proto-algorithm.

A signal with a known spectrum equal to the maximum usable instantaneous band of the transceiver is generated (1002) and modulated by a carrier signal along the entire spectrum of the internal band. Once generated, the signal is transmitted by one of N antennas (72), where N is equal to the number of antennas used by the apparatus.

The signal generated in the previous point is received by the remaining N−1 antennas and by the transmitting antenna itself to be read by the transceiver (1003).

The distances of the reflections received by the antennas due to the passage of the transmitted, reflected, diffracted and attenuated waves in the subject's tissues are calculated (1004) as phase difference of the received signal (1003) and transmitted signal (1002) for each frequency contained in the spectrum of the transmitted signal (1002). The profile of the distances of each reflection and feature of the signals received for each frequency contained in the spectrum of the transmitted signal is thus obtained.

The profile of the distances for each frequency, calculated in the previous point, is linearised by extracting the relative parameters of the dielectric, necessary to obtain the aforementioned linearisation (1005).

Starting from the dielectric parameters of the imaging area environment (1001) and the relative differences calculated in the previous point, the absolute parameters of the dielectrics forming part of the subject's tissues are calculated (1006).

The parameters of the identified dielectrics, calculated in the previous point (1006), and the distances (1004) calculated for each reflection are collected to extract the tomographic image (tissue distances) and assign to each closed area a characteristic colour of the tissue therein identified (1007) which has characteristics of proportionality, by way of example in its tone, intensity or pattern, with respect to the certainty that the identification is correct.

Upon calculation of the features of the crossed tissue (1006) and extraction of the image with relative identification of the tissues (1007), the apparatus communicates with the network (901), where available, by sending the collected data and comparing them with the database available, to identify possible patterns or areas that may need more detail, to investigate a possible diagnosis already present in the database or to investigate a new hypothesis entered by the user.

At (1007) the image available on the user interface is updated with the information obtained from the apparatus, through the data acquired internally and from the network.

If there is a need for a greater degree of detail in the image or less uncertainty about the identification of a certain tissue indicated either by the user or by the network, the algorithm is repeated iteratively from (1002) to (1007) by running each time the steps (1003) (1004) (1005) (1006) (1007) on the data collected from all previous iterations and the one in progress.

Apparatuses Network According to the Invention

Advantageously, two or more apparatuses according to the invention can be connected, in order to share the generated data and constitute an anonymous database capable of supporting the diagnosis by the user. The above mentioned database preferably comprises:

- Symptoms, signs, risk factors and diagnoses available in the literature, of subjects affected by certain conditions and pathologies compared to certain demographic groups.
- Symptoms, signs, clinical picture and diagnosis of anonymous subjects affected by certain conditions and pathologies examined using CT or NMR machines, preferably including the images obtained by the aforementioned machines.
- Symptoms, signs, clinical picture, preliminary diagnoses following analysis with the apparatus and definitive analysis, where available, with different protocols and machinery of anonymous subjects, suffering from certain conditions and pathologies examined using the systems and procedures described here and including the images and data obtained from the aforementioned apparatuses.

Where two or more apparatuses are connected to each other, the apparatuses in use, in the context of the execution of a protocol, share with the network the data acquired on the subject and related information during the execution of the analysis itself. The data, once collected from the network, are compared and analysed with the database available to the network and, where there are recurring features, the network generates an uncertainty estimate of the diagnostic hypothesis related to the aforementioned features and identifies the subsequent actions to be followed, to validate or not validate the hypothesis that the identified features are consistent with the analysis of the subject. The validation or dispute of the identified hypothesis is quantified in the increase or decrease of the uncertainty therewith associated. By way of example, a possible action to be performed to validate or not validate the hypothesis includes the adaptive movement of the antennas to focus the apparatus on a certain area of the subject.

Advantages

The advantages achieved by the present invention are briefly reported below:

- The initial cost of the proposed apparatus is 10 to 1000 times lower than the alternative imaging techniques that do not require direct contact with the subject and that do not use ionizing radiation such as nuclear magnetic resonance (NMR). CT machines have lower costs than NMR, but they use ionizing rays and are not suitable for first level examinations.
- The operating cost of the proposed apparatus, in terms of electricity consumption, is estimated to be 10 to 200 times lower than the alternative MRI: the current consumption of an MRI machine varies from 1 kW to 20 kW during examination, while for the present invention the consumption would be between 100 and 200 W.
- The operation of the proposed apparatus does not require dedicated environments: MRI and CT machines require dedicated environments due to their operational nature, operator safety, size and weight. The invention reported here, being in a portable structure and not using ionizing waves, does not require special environments to operate.
- Diagnosis time: MRI and CT techniques require several days to obtain an analysis and diagnosis on the examination performed and up to 1 hour to perform the analysis itself. The invention described here requires at most 1 minute to obtain the first images of the patient, allowing the attending physician to have a first idea of the patient's clinical situation during the visit itself.
- Possibility of use in small medical practices for first level diagnosis: often diagnoses of various symptoms can be complicated and show signs of serious pathologies such as cancer, tumours or cysts which, if not treated, could lead to serious consequences. The invention proposed makes the opportunity to perform a first screening on the patient accessible even to small medical practices, to estimate the need for more in-depth examinations (MRI-CT) for the probable presence of these symptoms, or the need for more probable basic treatments.
- Possibility of use for the diagnosis of pleural effusions, interstitial pneumonia and all pathologies that give rise to a change in the dielectric properties of otherwise healthy body tissues, with the advantage of speeding up the diagnosis of these pathologies rather than resorting to Computed Tomography (CT), X-rays, and/or Nuclear Magnetic Resonance (NMR).

Bibliography

1. A. I. di Oncologia Medica, "I numeri del cancro in italia, 2019—aiom—airt—siapec," (2019).
2. W. N. Al-Holou, S. Terman, C. Kilburg, H. J. L. Garton, K. M. Muraszko, and C. O. Maher, "Prevalence and natural history of arachnoid cysts in adults," J. Neurosurg. 118, 222-231 (2013).
3. W. N. Al-Holou, A. Y. Yew, Z. E. Boomsaad, H. J. L. Garton, K. M. Muraszko, and C. O. Maher, "Prevalence and natural history of arach-noid cysts in children," J. Neurosurgery: Pediatr. 5, 578-585 (2010).
4. I. I. N. di Statistica, "Bilancio demografico popolazione residente, http://demo.istat.it/pop2019/index.html," (2019).
5. P. B. Gjerde, M. Schmid, Hammar, and K. Wester, "Intracranial arach-noid cysts: impairment of higher cognitive functions and postoperative improvement," J. Neurodev. Disord. 5, 21 (2013).
6. P. B. Gjerde, S. Litleskare, N. G. Lura, T. Tangen, C. A. Helland, and K. Wester, "Anxiety and depression in patients with intracranial arach-noid cysts—a prospective study," World Neurosurg. 132 (2019).
7. C. Y. C. J. L. Z. Huang J H, Mei W Z, "Analysis on clinical characteristics of intracranial arachnoid cysts in 488 pediatric cases." Int J Clin Exp Med. pp. 18343-50 (2015).
8. A. J. Avery, M. Ghaleb, N. Barber, B. D. Franklin, S. J. Armstrong, B. Serumaga, S. Dhillon, A. Freyer, R. Howard, O. Talabi, and et al., "The prevalence and nature of prescribing and monitoring errors in English general practice: a retrospective case note review," Br. J. Gen. Pract. 63 (2013).

9. OECD, Health at a Glance 2019 (2019).
10. S. R. Elgart, M. Bostani, K. C. Mok, A. Adibi, S. Ruehm, D. Enzmann, M. Mcnitt-Gray, and K. S. Iwamoto, "Investigation of dna damage dose-response kinetics after ionizing radiation schemes similar to ct protocols," Radiat. Res. 183, 701-707 (2015).
11. P. Tomà, A. Bartoloni, S. Salerno, C. Granata, V. Cannatà, A. Magistrelli, and O. J. Arthurs, "Protecting sensitive patient groups from imaging using ionizing radiation: effects during pregnancy, in fetal life and childhood," La radiologia medica 124,736-744 (2019).
12. S. Colagrande, D. Origgi, G. Zatelli, A. Giovagnoni, and S. Salerno, "Ct exposure in adult and paediatric patients: a review of the mechanisms of damage, relative dose and consequent possible risks," La radiologia medica 119, 803-810 (2014).
13. F. G. Ariste R, "Could mri and ct scanners be operated more intensively in Canada?" Heal. Policy pp. e113-20 (2007).
14. C. L. Sistrom and N. L. Mckay, "Costs, charges, and revenues for hospital diagnostic imaging procedures: Differences by modality and hospital characteristics," J. Am. Coll. Radio!. 2, 511-519 (2005).
15. S. Imai, M. Akahane, and T. Imamura, "Computed tomography: Return on investment and regional disparity factor analysis," Front. Public Heal. 6 (2019).
16. B. J. Peng, Y. Wu, S. R. Cherry, and J. H. Walton, "New shielding configurations for a simultaneous pet/mri scanner at 7t," J. Magn. Reson. 239, 50-56 (2014).
17. B. J. Lee, R. D. Watkins, C.-M. Chang, and C. S. Levin, "Low eddy current rf shielding enclosure designs for 3t mr applications," Magn. Reson. Medicine 79, 1745-1752 (2017).
18. K. hoong Ng, "Non-ionizing radiations—sources, biological effects, emissions and exposures," (2003).
19. G. T. Herman, Fundamentals of computerized tomography: Image reconstruction from projection (2009).
20. D. Andreuccetti, R. Fossi and C. Petrucci: An Internet resource for the calculation of the dielectric properties of body tissues in the frequency range 10 Hz-100 GHz. IFAC-CNR, Florence (Italy), 1997. Based on data published by C. Gabriel et al. in 1996. [Online]. Available: http://niremf.ifac.cnr.it/tissprop/
21. Hasgall P A, Di Gennaro F, Baumgartner C, Neufeld E, Lloyd B, Gosselin M C, Payne D, Klingenböck A, Kuster N, "IT'IS Database for thermal and electromagnetic parameters of biological tissues," Version 4.0, May 15, 2018, DOI: 10.13099/VIP21000-04-0. itis.swiss/database
22. Hotta S. (2020) Reflection and Transmission of Electromagnetic Waves in Dielectric Media. In: Mathematical Physical Chemistry. Springer, Singapore. https://doi.org/10.1007/978-981-15-2225-3_8

The invention claimed is:

1. An apparatus for performing tomographies by means of not ionizing electromagnetic waves, the apparatus having a main body which develops around an X axis, the apparatus comprising:
a plurality of radio transmitting and radio receiving elements, the elements configured to;
transmit said not ionizing electromagnetic waves to an imaging area including the X axis, in response to corresponding transmission signals transmitted by a signal generation and reception unit, and
receive said not ionizing electromagnetic waves from that imaging area;
a signal generation and reception unit, operatively connected to the plurality of radio transmitting and radio receiving elements and configured to
generate said corresponding transmission signals for the plurality of radio transmitting and radio receiving elements, and
receive corresponding return signals from the plurality of radio transmitting and radio receiving elements, in response to said not ionizing electromagnetic waves received from that imaging area; and
a signal processing unit, operatively connected to the signal generation and reception unit, configured to process said corresponding returned signals received by the plurality of radio transmitting and radio receiving elements and implement a tomography reconstruction algorithm to obtain a corresponding image;
at least one support comprising at least one guide, arranged on a respective plane in the main body; and
a movement structure configured to move the at least one support according to a rotation movement in said plane;
the support also comprising at least one blade, each blade having one proximal end, connected to said guide through fixing means, and a distal end, connected to one or more of the plurality of radio transmitting and radio receiving elements and being configured to allow, in use, a first positioning of at least one of the plurality of radio transmitting and radio receiving elements at a distance R from a given point of the X axis and a second positioning, wherein at least one of the plurality of radio transmitting and radio receiving elements is at a distance R' from said point, with R' different from R.

2. The apparatus according to claim 1, wherein the rotation movement of the at least one support is on a plane orthogonal to said X axis and the main body comprises a hollow cylindrical structure whose axis coincides with the X axis, is configured to perform linear movements along the X axis and/or circular movements with respect to the same axis, where the plurality of radio transmitting and radio receiving elements is oriented towards the imaging area.

3. The apparatus according to claim 1, wherein the rotation movement of the at least one support is on a plane parallel to said X axis and the main body comprises two parallel plates opposite with respect to the X axis, each plate comprising at least one support whose radio transmitting and radio receiving elements are oriented parallel to each other along a second axis Z perpendicular to the X axis and toward the imaging area comprised between the two plates.

4. The apparatus according to claim 1, wherein:
the at least one support comprises at the least one couple of blades, each blade having
a distal end hinged with the distal end of the other blade and supporting at least one of the plurality of radio transmitting and radio receiving elements,
a proximal end rotatably mounted on said fixing means, and
wherein;
the fixing means are configured to slide within the guide, so that the two blades of the couple of blades can rotate on said plane and along said guide and the one or more of the plurality of radio transmitting and radio receiving elements connected therewith can be moved between the first and second positioning.

5. The apparatus according to claim 4, wherein the at least one support comprises two or more couple of blades, each couple being configured to be arranged with respect to said guide so that the plurality of radio transmitting and radio receiving elements connected therewith can be moved between a respective first positioning and a respective second positioning, independently of the other couples of blades.

6. The apparatus according to claim 1, comprising at least one blade slidably mounted on a respective fixing means and supporting at the distal end at least two elements of the plurality of radio transmitting and radio receiving elements, the fixing means being fixed onto said guide, so that the respective blade can slide radially to and from the center of said guide between the first and the second positioning.

7. The apparatus according to claim 6, wherein the at least one support comprises two or more blades, each blade being configured to be arranged with respect to said guide so that the two elements of the plurality of radio transmitting and radio receiving elements supported by each blade can be moved between a respective first positioning and a respective second positioning, independently of the other blade.

8. The apparatus according to claim 1, wherein the guide is circular.

9. The apparatus according to claim 1, wherein R and R' are both comprised between 5 and 50 cm.

10. The apparatus according to claim 1, operatively connected with a network of devices comprising a database of images, the apparatus being configured to carry out a method for acquiring tomographic images, comprising the steps:
  a. arranging said apparatus and placing a subject or a solid sample at the X axis within the imaging area;
  b. carrying out at least a first acquisition by,
    placing the radio transmitting and radio receiving elements, through the movement structure, at a distance R from a given point on the X axis,
    through the signal generation and reception unit, generating corresponding transmission signals for the plurality of radio transmitting and radio receiving elements,
    through the plurality of radio transmitting and radio receiving elements transmitting corresponding not ionizing electromagnetic waves to the imaging area including the X axis,
    through the plurality of radio transmitting and radio receiving elements receiving the not ionizing electromagnetic waves from that imaging area transmitted, absorbed and reflected by the subject or solid sample,
    through the signal generation and reception unit, receiving corresponding return signals from the plurality of radio transmitting and radio receiving elements,
    through said signal processing unit, implementing a tomography reconstruction algorithm to obtain an image;
  c. carrying out at least a second acquisition by
    placing the radio transmitting and radio receiving elements, through the movement structure, at a distance R' from said given point on the X axis,
    through the signal generation and reception unit, generating corresponding transmission signals for the plurality of radio transmitting and radio receiving elements,
    through the plurality of radio transmitting and radio receiving elements transmitting corresponding not ionizing electromagnetic waves to an imaging area including the X axis,
    through the plurality of radio transmitting and radio receiving elements receiving the not ionizing electromagnetic waves from that imaging area transmitted, absorbed and reflected by the subject or solid sample,
    through the signal generation and reception unit, receiving corresponding return signals from the plurality of radio transmitting and radio receiving elements,
    through said signal processing unit, implementing a tomography reconstruction algorithm to obtain an image;
  the apparatus being also configured to transmit the obtained images to the network of devices, wherein a comparison between the obtained images and the images of the database is carried out for recognizing patterns or recurring structures, the apparatus being configured to receive a result of such a comparison and to move, through said movement structure, if required, the plurality of radio transmitting and radio receiving elements accordingly, for another implementation of said method.

11. A method for acquiring tomographic images using an apparatus having a main body which develops around an X axis, the apparatus comprising:
  a plurality of radio transmitting and radio receiving elements, configured to transmit not ionizing electromagnetic waves to an imaging area including the X axis, in response to corresponding transmission signals transmitted by a signal generation and reception unit, and
  receive said not ionizing electromagnetic waves from that imaging area;
  a signal generation and reception unit, operatively connected to the plurality of radio transmitting and radio receiving elements and configured to
  generate said corresponding transmission signals for the plurality of radio transmitting and radio receiving elements, and
  receive corresponding return signals from the plurality of radio transmitting and radio receiving elements, in response to said not ionizing electromagnetic waves received from that imaging area; and
  a signal processing unit, operatively connected to the signal generation and reception unit, configured to process said corresponding returned signals received by the plurality of radio transmitting and radio receiving elements and implement a tomography reconstruction algorithm to obtain a corresponding image;
  at least one support comprising at least one guide, arranged on a respective plane in the main body; and
  a movement structure configured to move the at least one support according to a rotation movement in said plane;
  the support also comprising at least one blade, each blade having one proximal end, connected to said guide through fixing means, and a distal end, connected to one or more of the plurality of radio transmitting and radio receiving elements and being configured to allow, in use, a first positioning of at least one of the plurality of radio transmitting and radio receiving elements at a distance R from a given point of the X axis and a second positioning, wherein at least one of the plurality of radio transmitting and radio receiving elements is at a distance R' from said point, with R' different from R;
  the method comprising the steps:

a. arranging the apparatus and placing a subject or a solid sample at the X axis within the imaging area;

b. carrying out at least a first acquisition by placing the radio transmitting and radio receiving elements, through the movement structure, at a distance R from a given point on the X axis, through the signal generation and reception unit, generating corresponding transmission signals for the plurality of radio transmitting and radio receiving elements, through the plurality of radio transmitting and radio receiving elements transmitting corresponding not ionizing electromagnetic waves to the imaging area including the X axis, through the plurality of radio transmitting and radio receiving elements receiving the not ionizing electromagnetic waves from that imaging area transmitted, absorbed and reflected by the subject or solid sample, through the signal generation and reception unit, receiving corresponding return signals from the plurality of radio transmitting and radio receiving elements, through said signal processing unit, implementing a tomography reconstruction algorithm to obtain an image;

c. carrying out at least a second acquisition by, placing the radio transmitting and radio receiving elements, through the movement structure, at a distance R' from said given point on the X axis, through the signal generation and reception unit, generating corresponding transmission signals for the plurality of radio transmitting and radio receiving elements, through the plurality of radio transmitting and radio receiving elements transmitting corresponding not ionizing electromagnetic waves to an imaging area including the X axis, through the plurality of radio transmitting and radio receiving elements receiving the not ionizing electromagnetic waves from that imaging area transmitted, absorbed and reflected by the subject or solid sample, through the signal generation and reception unit, receiving corresponding return signals from the plurality of radio transmitting and radio receiving elements, through said signal processing unit, implementing a tomography reconstruction algorithm to obtain an image.

12. The method for acquiring tomographic images according to claim 11, further comprising the step of conducting, through said signal processing unit, a dielectric spectroscopic investigation, based on the return signals received from the plurality of radio transmitting and radio receiving elements.

\* \* \* \* \*